Nov. 11, 1958  F. G. BACK  2,859,654

VARIFOCAL VIEWFINDERS

Filed Dec. 2, 1953

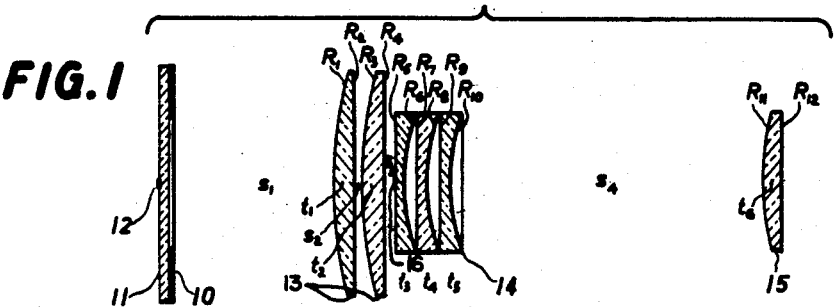

FIG. 1

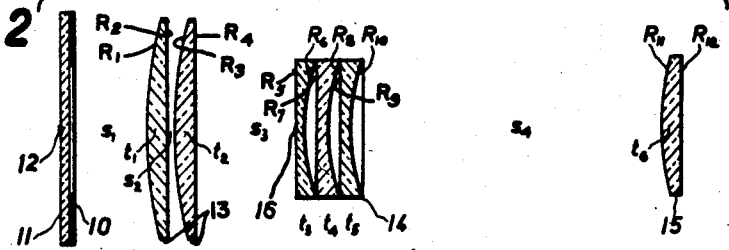

FIG. 2

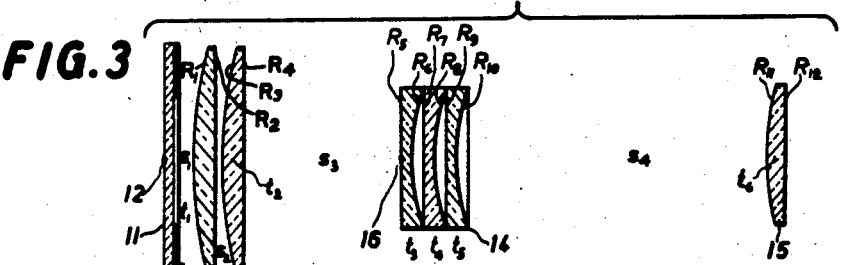

| LENS | GLASS | RADII | THICKNESS | SEPARATION |
|---|---|---|---|---|
| 13 | BSC $N_D=1.517$ $V=64.5$ | $R_1=+89.00$ $R_2=$ INF. | $t_1=4.30$ | $s_1=$ variable from 33.00 to 3.00 |
| | BSC $N_D=1.517$ $V=64.5$ | $R_3=+89.00$ $R_4=$ INF. | $t_2=4.30$ | $s_2=$ 0.50 |
| 14 | BSC $N_D=1.517$ $V=64.5$ | $R_5=$ INF. $R_6=-40.00$ | $t_3=4.50$ | $s_3=$ variable from 1.00 to 31.00 |
| | BSC $N_D=1.517$ $V=64.5$ | $R_7=$ INF. $R_8=-40.00$ | $t_4=4.50$ | |
| | BSC $N_D=1.517$ $V=64.5$ | $R_9=$ INF. $R_{10}=-40.00$ | $t_5=4.50$ | $s_4=$ 58.50 |
| 15 | BSC $N_D=1.517$ $V=64.5$ | $R_{11}=+61.40$ $R_{12}=$ INF. | $t_6=4.50$ | |

BSC = Boro Silicate Crown
$N_D$ = Index of Refraction for Sodium Light
V = Abbe's Dispersion Number

INVENTOR.
FRANK G. BACK

United States Patent Office 2,859,654
Patented Nov. 11, 1958

2,859,654

VARIFOCAL VIEWFINDERS

Frank G. Back, Glen Cove, N. Y.

Application December 2, 1953, Serial No. 395,809

2 Claims. (Cl. 88—1.5)

The present invention relates to viewfinders for motion picture cameras and the like and in particular to a new and improved design for varifocal viewfinders.

It is an object of the present invention to provide a new varifocal viewfinder, which does not require close sighting and has no peephole or similar auxiliary sighting means to be used in connection with it.

It is a further object of the present invention to provide a novel varifocal viewfinder in which the apparent frame size remains constant.

A preferred form of the present invention is shown and illustrated in the accompanying drawings, in which the optical principles are illustrated diagrammatically.

In the drawings:

Fig. 1 illustrates diagrammatically the optical arrangement of the present invention in wide angle position.

Fig. 2 is a diagram as in Fig. 1, illustrating an intermediate position.

Fig. 3 is a diagram as in Fig. 1, illustrating the optical arrangement in telephoto position; and Fig. 4 is a table specifying the characteristics of the lens elements employed in the illustrated preferred forms of the present invention.

The varifocal viewfinder in the present invention consists of a construction, comprising a fixed frame 10 with a transparent front plate 11. The transparent front plate 11 is provided with a reticle 12. A movable positive lens component 13 is arranged behind said frame 10 and the transparent front plate 11. A fixed negative lens component 14 is spaced behind said movable positive lens component 13. This fixed negative lens component 14 is provided with a reticle 16. The reticle 16 serves together with the first named reticle 12 to allow the exact aiming of the varifocal viewfinder along its axis. At a fixed distance behind the negative lens component 14 the positive lens component 15 is positioned. The positive lens component 15 collimates the 2 reticles 12 and 16 into the accomodation range of the human eye. The negative lens component 14 and the positive lens component 15 together form an eyepiece which is characterized by long eye relief characteristics.

This optical arrangement functions as follows: The movable positive lens component 13 would form a real, inverted image of an object, however, this image formation is intercepted by the eyepiece consisting of the negative lens component 14 and the positive lens component 15 so that a reduced, erect virtual image of the object within the accomodation range of the human eye is formed.

Lens combination 13, 14 and 15 constitutes a reducing telescope for any object, wherein the reducing effect becomes the more pronounced the more the lens 13 moves toward lenses 14 and 15. At the same time lens 13 acts as a simple magnifier with respect to the frame 11 which is positioned very close to the lens 13 wherein the image size of frame 11 increases when lens 13 moves away from it and vice versa.

Consequently, reducing and magnifying effect of the movement of lens 13 cancel each other out with respect to the frame 11 maintaining its apparent size constant, while the apparent size of a distant object is reduced or increased, when lens 13 moves toward or away from lens combination 14 and 15 respectively.

With respect to a distinct object the positive movable lens member 13 acts as an objective and will therefore not contribute any offsetting magnification so that only the variable reducing effect of the lens 13 eyepiece will determine the image size.

In the diagrammatical drawings, Figs. 1, 2 and 3, three positions are illustrated respectively showing the viewfinder in positions suitable for wide angle viewing for viewing with a standard camera lens, and for telephoto viewing, it being understood that in all other positions the device is equally operative.

For the purpose of exemplification specific data for the lens elements employed in the present invention are set forth in Table 1 and Fig. 4 it being understood that these data are given by way of illustration only and not as limiting the scope of the present invention. The specific lens system set forth in Fig. 4 comprising one preferred embodiment of the present invention as illustrated, consists of:

*Table 1*

| Lens | Glass | Radii | Thickness | Separation |
|---|---|---|---|---|
|  |  |  |  | $s_1$=variable from 33.00 to 3.00. |
| 13 | BSC $N_D$=1.517 V=64.5 | $R_1$=89.00 $R_2$=Inf. | $t_1$=4.30 |  |
|  |  |  |  | $s_2$=0.50. |
|  | BSC $N_D$=1.517 V=64.5 | $R_3$=89.00 $R_4$=Inf. | $t_2$=4.30 |  |
|  |  |  |  | $s_3$=variable from 1.00 to 31.00. |
| 14 | BSC $N_D$=1.517 V=64.5 | $R_5$=Inf. $R_6$=40.00 | $t_3$=4.50 |  |
|  | BSC $N_D$=1.517 V=64.5 | $R_7$=Inf. $R_8$=40.00 | $t_4$=4.50 |  |
|  | BSC $N_D$=1.517 V=64.5 | $R_9$=Inf. $R_{10}$=40.00 | $t_5$=4.50 |  |
|  |  |  |  | $s_4$=58.50. |
| 15 | BSC $N_D$=1.517 V=64.5 | $R_{11}$=61.40 $R_{12}$=Inf. | $t_6$=4.50 |  |

BSC—Boro silicate crown.
$N_D$—Index of refraction for sodium light.
V—Abbe's dispersion number.

In Table 1, specific elements have been recited in order to adequately illustrate the principles of the present invention. It will be obvious to those skilled in the art, that alterations and modification may be made without thereby departing from the spirit and scope of the present invention, which shall only be limited by the appended claims.

Having set forth my invention what I desire to claim and secure by Letters Patent is:

1. A varifocal viewfinder for motion picture cameras and the like comprising, in combination, a fixed front frame, a movable positive lens component behind said frame spaced from said frame a distance less than its focal length and movable toward and away from said frame within said distance, a fixed negative lens component behind the positive lens spaced from said positive lens a distance within the focal length of the positive lens, said negative lens component having a focal length less than that of the positive lens, a fixed positive lens behind the fixed negative lens, whereby the movable positive lens component alone would form an inverted real image of the object and an upright magnified virtual image of the frame, but in conjunction with the negative lens component forms an upright virtual image of the object and an upright reduced virtual image of the frame and whereby movement of the positive lens component produces variable magnification of the object while the magnification of the frame image by the movable positive lens is substantially compensated for by the reduction of said frame image produced by the stationary negative lens component for all positions of the movable lens, and the fixed positive lens images both said virtual images formed by the movable positive lens component in conjunction with the negative lens component being located at a distance within the accommodation range of the human eye.

2. A varifocal viewfinder for motion picture cameras and the like according to claim 1 in which the movable positive lens component, the fixed negative lens component, and the fixed positive lens component have the following specifications:

| Lens | Glass | Radii | Thickness | Spacing |
|---|---|---|---|---|
| Movable positive lens component | BSC $N_D=1.517$ $V=64.5$ | $R_1=+89.00$ $R_2=$Inf. | $t_1=4.30$ | from frame to front lens = variable from 33.00 to 3.00. |
| | BSC $N_D=1.517$ $V=64.5$ | $R_3=+89.00$ $R_4=$Inf. | $t_2=4.30$ | between movable lens = 0.50. |
| | | | | between front and negative lens = 1.00 to 31.00. |
| Fixed negative lens component | BSC $N_D=1.517$ $V=64.5$ | $R_5=$Inf. $R_6=40.00$ | $t_3=4.50$ | |
| | BSC $N_D=1.517$ $V=64.5$ | $R_7=$Inf. $R_8=40.00$ | $t_4=4.50$ | |
| | BSC $N_D=1.517$ $V=64.5$ | $R_9=$Inf. $R_{10}=40.00$ | $t_5=4.50$ | |
| | | | | between negative and rear lens = 58.50. |
| Fixed positive lens component | BSC $N_D=1.517$ $V=64.5$ | $R_{11}=+61.40$ $R_{12}=$Inf. | $t_6=4.50$ | | and in which

BSC represents boro silicate crown and
$N_D$ represents index of refraction for sodium light and
V is Abbe's dispersion number and
R is the radius of curvature and
$t$ represents thickness.

References Cited in the file of this patent

UNITED STATES PATENTS

| | | |
|---|---|---|
| 547,243 | Colvin | Oct. 1, 1895 |
| 1,879,412 | Mueller | Sept. 27, 1932 |
| 2,578,574 | Miles | Dec. 11, 1951 |

FOREIGN PATENTS

| | | |
|---|---|---|
| 1,035,957 | France | Apr. 22, 1953 |